United States Patent [19]

Signouret et al.

[11] 3,862,922

[45] Jan. 28, 1975

[54] PROCESS FOR THE PREPARATION OF ORGANIC DITHIOL POLYSULFIDES

[75] Inventors: Jean-Baptiste Signouret, Billere; Yves Labat, Pau; Christian Esclamadon, Billere, all of France

[73] Assignee: Societe Nationale des Petroles D'Aquitaine, Courbevoie, France

[22] Filed: Sept. 12, 1973

[21] Appl. No.: 396,444

Related U.S. Application Data

[63] Continuation-in-part of Ser. No. 199,321, Nov. 16, 1971, abandoned.

[30] Foreign Application Priority Data

Nov. 20, 1970 France .............................. 70.41789

[52] U.S. Cl. .............. 260/79, 117/124 E, 260/37 R
[51] Int. Cl. ............................................. C08g 23/00
[58] Field of Search ..................... 260/608, 79, 79.1

[56] References Cited
UNITED STATES PATENTS

| 2,278,127 | 3/1942 | Patrick | 260/79.1 |
| 2,466,963 | 4/1949 | Patrick et al. | 260/79.1 |
| 2,910,922 | 11/1959 | Horning | 260/79.1 |
| 3,331,818 | 7/1967 | Bertozzi | 260/79.1 |
| 3,352,837 | 11/1967 | Signouret | 260/79 |
| 3,402,155 | 9/1968 | Kutch | 260/79 |

Primary Examiner—Melvyn I. Marquis

[57] ABSTRACT

A process for the preparation of organic dithiol polysulfides with a molecular weight of between 500 and 10,000, characterized by the fact that these products are obtained when a dihalogenated organic derivative and hydrogen sulfide react simultaneously with an alkaline polysulfide solution. New products are obtained by this process, using dichlorodiethyl formal and dichlorodibutyl formal. These dithiol polysulfides react with sulfur to form either plasticized sulfur, with many possible applications in the coating field, or polysulfide polymers, one of the applications of which is the modification of bitumens.

5 Claims, No Drawings

PROCESS FOR THE PREPARATION OF ORGANIC DITHIOL POLYSULFIDES

This application is a continuation-in-part of our co-pending application Ser. No. 199,321 filed Nov. 16, 1971 and now abandoned.

This invention concerns the preparation of dithiol polysulfides having the general formula HS—(R—$S_x$—)$_n$R—SH. These products are characterized by containing within the two terminal thiol groups polysulfide chains $S_x$, wherein $x$ may be from 2 to 6, linked to alkyl hydrocarbon groups R, having 1 to 12 carbon atoms and $n$ is from 3 to 20. These alkyl groups may be substituted by oxygen or sulfur, i.e., oxygen or sulfur substituted alkyl groups.

The invention also concerns the new dithiol polysulfides thus obtained.

Dithiol polysulfides of this kind are extremely useful industrial products, providing an excellent material for the plasticization of sulfur or preparation of polysulfide polymers. The plastic sulfur materials obtained by the reaction of molten sulfur with these dithiol polysulfides can be used in many fields. The relative proportions of each ingredient, sulfur and dithiol polysulfide, can vary widely: from 99 to 1% sulfur, for example, can be made to react with dithiol polysulfides obtained by the process, resulting either in a plasticized sulfur, in other words a plastic substance containing free, non-combined sulfur, or in a polysulfide which is free from sulfur, with a higher molecular weight than the original dithiol polysulfide. These compositions are excellent as coatings, particularly for concrete, brick, asphalted or bitumen-covered ground, or similar materials. One especially useful application is for lines on roads. They can also be poured directly onto the ground as a covering, possibly mixed with sand and/or gravel, with which they form an excellent cement. They may also be used for seals, or as mastic, or as a building material. Naturally, the sulfur composition obtained may be modified by any existing means to endow it with adhesive and flameproof qualities. It is also possible to add plastic, rubber or glass balls, or suitable coloring agents, to the plasticized sulfur, when laying road-lines. The materials may also be used as adjuvants or binders for mortar, asphalt, bitumen or any other similar material, where they act as modifying agents. The sulfur compositions, or the actual dithiol polysulfides obtained by the process according to the invention, are oil-modifying agents. They can also be used in all normal mercaptan applications.

A process already exists for obtaining dithiol polysulfides from dichlorodiethyl formal. It consists of producing a reaction between a sodium polysulfide and a mixture of dichlorodiethyl formal and trichloropropane. This results in a polymer with very high molecular weight, above 20,000, consisting largely of recurrent —$SCH_2$—$CH_2$—$OCH_2$—$OCH_2$—$CH_2S$—units. Nearly all the compounds are such that the first and last unit end in SH, but there are also units ending in OH. These compounds exist in the form of a latex, in other words a rubbery solid dispersed in water. This latex is washed until the sodium hydroxide is removed. It has to be retreated with sodium polysulfide solution of 2N concentration, for 1 hour at 100°C. This treatment increases the molecular weight of the product, and eliminates the chains ending in OH. It is washed again, and then treated with a mixture of pure HSNa and $SO_3Na_2$, for 1 to 2 hours at approximately 85°C. This produces a liquid, which is neutralized with acetic acid and then dried. This liquid product, known commercially as Thiokol $LP_3$, has a molecular weight of 1,000, and contains approximately 7% SH. It corresponds to a dithiol polysulfide possessing 6 recurring —$S(CH_2)_2OCH_2O(CH_2)_2S$—units. As can be seen, this is a lengthy process, and the liquid dithiol polysulfide is not obtained directly; instead, there is a solid polysulfide, the chains of which have to be broken. The numerous neutralization and washing operations make it an expensive process.

The process according to the present invention offers a way of overcoming all these drawbacks, and of obtaining directly dithiol polysulfides which are liquid at around 100°c, and have a molecular weight of between 500 and 10,000 typically between 1,600 to 1,700. These liquid products can be used directly, making this process economically very attractive. The new condensation process differs considerably from the method described above, as well as from the other processes for obtaining dithiol polysulfides. In particular, it is distinguished by the necessity of injecting hydrogen sulfide into the alkaline polysulfide solution at the same time as the dihalo compound, in order to restrict the molecular weight of the polysulfide resin, which remains liquid under these conditions.

The dihalogenated organic derivative used in the present invention has the form X—R—X, where R means the same as in the earlier formula, i.e., alkyl, oxygen or sulfur substituted alkyl, and X is halogen, preferably chlorine.

Particularly useful products are obtained when the dihalogenated derivative is a dichloro compound, and especially when it contains one or more oxygen and/or sulfur atoms. Highly recommended starting compounds for the manufacture of organic dithiol polysulfides include, though are not confined to, dichlorodiethyl formal, dichlorodipropyl formal, dichlorodibutyl formal, and dichlorodipropyl sulfide. Organic polysulfides derived from these starting compounds react with sulfur to produce plasticized sulfur, with a vitreous transition temperature of below −40°C. This is the property that gives plasticized sulfur its impact strength. The usefulness of plasticized sulfur increases as this transition temperature becomes lower. It is also possible to obtain polysulfide polymers, namely substances without any free elementary sulfur.

The alkaline polysulfide solution may be an aqueous solution of sodium, potassium or ammonia. In one embodiment of the invention, an aqueous sodium polysulfide solution, containing from 1 to 6 moles of polysulfide per liter, is used. The average sulfur rank (atom) of the alkaline polysulfide may range from 1.5 to 4, and preferably from 1.5 to 2.5. In one recommended embodiment of the invention, which results in polysulfides with fairly low molecular weight, in other words containing from 1 to 10 recurring —R—$S_x$— units, polysulfide having 2 to 2.25 sulfur atoms (rank) is used. This polysulfide is prepared by bringing about a reaction between sulfur and a sodium sulfide solution, and then by saturating the solution obtained with $H_2S$, or by the simultaneous reaction of an aqueous solution of sodium hydroxide, $H_2S$ and sulfur, so as to obtain an $H_2S$— saturated aqueous polysulfide solution. To obtain a polysulfide with an average sulfur rank of 2.2 moles of sodium hydroxide are used to 1 mole of sulfur.

The dithiol polysulfide is then obtained by reaction between the dihalogenated derivative and the alkaline polysulfide solution. This is done by introducing the dihalogenated derivative into the alkaline polysulfide solution, stirring vigorously. The introduction of the aforesaid dihalogenated compound may last from ½ hour to 5 hours, and preferably from 1 to 3 hours. The reaction temperature may vary from 80° to 120°C, and is usually around 100°C. According to one feature of the invention, hydrogen sulfide has to be introduced at the same time as the dihalo derivative, into the alkaline polysulfide solution, so as to restrict the molecular weight of the polysulfide resin, and obtain it in liquid form. There is at least 1 mole, and preferably 1.2 to 1.6 moles, of $H_2S$ per mole of alkaline polysulfide. When all the halogenated derivative has been added, the reaction mixture is allowed to react for about another hour, at temperatures of between 80° and 105°C, to complete the reaction. The reaction mixture is then allowed to cool to atmospheric temperature, and the aqueous layer is decanted, to separate the water-insoluble dithiol polysulfide. It is washed in cold water until the washing water is neutral. A liquid resin, which can be vacuum-dried, is obtained.

Although stoichiometric quantities of alkaline disulfide and dihalogenated derivative can be used, it is preferable to have an excess of alkaline disulfide, so that there is a slight surplus of alkali in relation to halogen, ensuring that the halogen is eliminated completely, in the form of alkaline halide. There should generally be an excess of 0.1 to 0.5 moles of disulfide per mole of the dihalo derivative.

When the dihalogenated derivative is dichlorodiethyl formal, a liquid dithiol polysulfide is obtained with a molecular mass between 1,600 and 2,200 when the sulfur rank is between 2 and 2.25, and containing about 4% SH, and about 41% sulfur. This polysulfide is a viscous liquid, green in color. This resin differs from the product Thiokol $LP_3$, which is a fairly fluid liquid, red in color, with a molecular mass of about 1000 and which contains about 7% SH and about 28% sulfur.

The invention is illustrated by, without in any way being confined to, the following examples.

EXAMPLE 1

800 g of pure sodium hydroxide, 4,200 g of water, and 320g of sulfur are pleaced in a 10-litre reactor with a stirring system, gas inlet and temperature-measuring point. 340 g of hydrogen sulphide are simultaneously injected. This produces a polysulfide $S_2Na_2$. While the reactor is stirred vigorously, 1,650 g of dichlorodiethyl formal and 540 g of hydrogen sulfide are fed in gradually, over 1½ hours. The reaction occurs at 98° to 100°C. When all the $H_2S$ has been added, the reaction is allowed to continue for another hour at the same temperature. The reaction mixture is then cooled. The resin is separated and washed until the washing water is neutral. The product is then dried, resulting in 1,600 g of liquid resin containing 40.5% sulfur, and 4% SH, and with a molecular weight of about 1,600. When 10% weight of this resin is made to react with sulfur for 1 hour at 170°C, a plasticized sulfur is obtained, with a vitreous transition temperature Tg of —42°C.

EXAMPLE 2

The same equipment is used as in Example 1. An aqueous sodium hydroxide solution, consisting of 800 g of sodium hydroxide and 4,200 g of water, and 320 g of sulfur, is placed in the reactor. It is stirred vigorously at 95°C. The sodium polysulfide solution $S_2Na_2$ is saturated by a flow of hydrogen sulfide gas, and the saturated solution is treated as before with 1,650 g of dichlorodiethyl formal and 540 g of $H_2S$. The process produces 1,620 g of resin containing 41% combined sulfur and 4% SH, and with an average molecular weight of 1,600. When 10% weight of this resin is made to react with sulfur for one hour at 170°C, a plasticized sulfur is obtained with a Tg of —43°C.

EXAMPLE 3

The experimental conditions are the same as for example 2, except that sodium polysulfide having an average sulfur rank of 2.25 is used, prepared from 800 g of sodium hydroxide, 4,200 g of water and 400 g of sulfur. The polysulfide thus obtained is saturated with $H_2S$ at 95°C. While this solution is stirred vigorously, 1,650 g of dichlorodiethyl formal and 540 g of $H_2S$ are added gradually. The reaction mixture is treated as before, resulting is 1,680 g of liquid resin containing 41.6% sulfur, and 2% SH, with an average molecular weight of 3,300. When 10% weight of this resin is made to react with sulfur for one hour at 170°C, a plastic sulfur is obtained, with a Tg of —43°C.

EXAMPLE 4.

The experimental conditions are the same as in example 2, except that 200 g of dichlorodibutyl formal are used instead of dichlorodiethyl formal. The resin is extracted with toluene and washed in water until the washing water is neutral. The substance is dried and the toluene evaporated in a vacuum, and 1,900 g of resin are obtained, containing 71% sulfur and 3% SH, and with an average molecular weight of 2,200. When 10% weight of this resin reacts with sulfur for 1 hour at 170°C, a plastic sulfur is obtained with a Tg of —60°C.

What is claimed is:

1. A process for the preparation of dithiol polysulfides having a molecular weight of between 500 and 10,000 comprising reacting simultaneously an aqueous solution of sodium, potassium or ammonia polysulfide with a compound of the formula X—R—X, wherein R is selected from the group consisting of alkyl of 1 to 12 carbon atoms, and oxygen or sulfur substituted alkyl and X is halogen, there being present 1.1 to 1.5 moles of said polysulfide per mole of said dihalogenated compound, introducing at the same time 1.2 to 1.6 moles of hydrogen sulfide per mole of said polysulfide into the reaction mixture so formed, the process being conducted at a temperature range from about 80°C to about 120°C.

2. A process according to claim 1 wherein the process is conducted at a temperature of about 100°C.

3. A process according to claim 1 wherein the starting compound X—R—X is dichlorodiethyl formal of the formula $Cl-CH_2-CH_2-OCH_2O-CH_2-CH_2-Cl$.

4. A process according to claim 1 wherein the starting compound X-R-X is dichlorodipropyl formal of the formula $Cl(CH_2)_3-OCH_2O-(CH_2)_3Cl$.

5. A process according to claim 1 wherein the starting compound X—R—X is dichlorodibutyl formal of the formula $Cl(CH_2)_4-OCH_2O-(CH_2)_4Cl$.

* * * * *